(12) United States Patent
Janjua

(10) Patent No.: US 9,868,075 B2
(45) Date of Patent: Jan. 16, 2018

(54) OIL WATER SEPARATION AND SKIMMING DEVICE

(75) Inventor: Rafique Janjua, Sugarland, TX (US)

(73) Assignee: Fluor Technologies Corporation, Sugar Land, TX (US)

( * ) Notice: Subject to any disclaimer, the term of this patent is extended or adjusted under 35 U.S.C. 154(b) by 562 days.

(21) Appl. No.: 13/992,670

(22) PCT Filed: Dec. 7, 2011

(86) PCT No.: PCT/US2011/063705
§ 371 (c)(1),
(2), (4) Date: Sep. 3, 2013

(87) PCT Pub. No.: WO2012/078732
PCT Pub. Date: Jun. 14, 2012

(65) Prior Publication Data
US 2013/0334142 A1    Dec. 19, 2013

Related U.S. Application Data

(60) Provisional application No. 61/420,622, filed on Dec. 7, 2010.

(51) Int. Cl.
| | | |
|---|---|---|
| *B01D 17/04* | (2006.01) | |
| *C02F 1/40* | (2006.01) | |
| *B01D 17/02* | (2006.01) | |
| *B01D 17/12* | (2006.01) | |

(Continued)

(52) U.S. Cl.
CPC ....... *B01D 17/045* (2013.01); *B01D 17/0214* (2013.01); *B01D 17/12* (2013.01); *C02F 1/40* (2013.01); *C02F 2101/32* (2013.01); *C02F 2103/365* (2013.01); *C02F 2209/005* (2013.01); *C02F 2209/40* (2013.01)

(58) Field of Classification Search
CPC .................................................. B01D 17/0211
See application file for complete search history.

(56) References Cited

U.S. PATENT DOCUMENTS

| 2,047,989 | A | | 7/1936 | Woelflin | |
|---|---|---|---|---|---|
| 4,366,063 | A | * | 12/1982 | O'Connor | B01D 17/02 166/267 |

(Continued)

FOREIGN PATENT DOCUMENTS

| DE | 19536310 A1 | 5/1996 |
|---|---|---|
| DE | 20308928 U1 | 11/2003 |

(Continued)

OTHER PUBLICATIONS

Driedger, W., "Controlling Vessels and Tanks", P. Eng. Sep. 7, 2001, first published in Hydrocarbon Processing Mar. 2000.

(Continued)

*Primary Examiner* — Clare M Perrin
(74) *Attorney, Agent, or Firm* — Conley Rose, P.C.

(57) ABSTRACT

Oil-containing water is separated in a separator in an automated/continuous operation using devices that are free of moving parts in the separation container. Operation is preferably entirely controlled via adjustment of various flow rates, typically using flow control valves and/or feed pumps in response to measurement of a guided wave radar device or other IDLT.

17 Claims, 1 Drawing Sheet

(51) Int. Cl.
*C02F 101/32* (2006.01)
*C02F 103/36* (2006.01)

(56) References Cited

U.S. PATENT DOCUMENTS

| | | | | |
|---|---|---|---|---|
| 4,428,841 | A * | 1/1984 | Favret, Jr. | B01D 17/00 210/170.01 |
| 4,624,763 | A | 11/1986 | Chimenti | |
| 4,722,800 | A * | 2/1988 | Aymong | B01D 17/0208 210/170.01 |
| 5,368,747 | A * | 11/1994 | Rymal, Jr. | B01D 17/02 210/137 |
| 5,378,353 | A | 1/1995 | Koch | |
| 5,435,920 | A | 7/1995 | Penth | |
| 6,143,183 | A | 11/2000 | Wardwell | |
| 7,758,738 | B2 | 7/2010 | Sams | |
| 2002/0112999 | A1 * | 8/2002 | Lee | B01D 17/0208 210/86 |
| 2003/0042213 | A1 * | 3/2003 | Hard | B01D 17/045 210/807 |
| 2005/0250860 | A1 * | 11/2005 | Appleford | B01D 17/0208 516/135 |
| 2007/0204750 | A1 * | 9/2007 | Liu | B01D 17/0211 96/182 |

FOREIGN PATENT DOCUMENTS

| | | | |
|---|---|---|---|
| GB | 2236688 A | 4/1991 | |
| NO | WO 2010080035 A1 * | 7/2010 | ......... B01D 17/0205 |
| WO | WO 2009032200 A1 * | 3/2009 | ............... B01D 3/14 |
| WO | 2010/066266 A1 | 6/2010 | |
| WO | 2012078732 A2 | 6/2012 | |

OTHER PUBLICATIONS

Olander, A., "Guided wave radars", Hydrocarbon Engineering, Apr. 2004.
PCT/US2011/063705 filed Dec. 7, 2011 entitled Oil Water Separation and Skimming Device, PCT Search Report & Written Opinion issued Apr. 19, 2012.
PCT/US2011/063705 filed Dec. 7, 2011 entitled Oil Water Separation and Skimming Device, International Preliminary Report on Patentability issued Mar. 19, 2013.
Europe Patent Application No. 11846161.5, Extended European Search Report, dated Aug. 12, 2014, 6 pages.
Europe Patent Application No. 11846161.5, Examination Report, dated Aug. 19, 2015, 5 pages.
Europe Patent Application No. 11846161.5, Invitation Pursuant to Article 94(3) and Rule 71 (1) EPC, dated May 6, 2016, 3 pages.
Europe Patent Application No. 11846161.5, Communication pursuant to Article 94(3) EPC dated Sep. 1, 2016, 3 pages.
Canada Patent Application No. 2820056, Examination Report, dated Jul. 31, 2014, 3 pages.

* cited by examiner

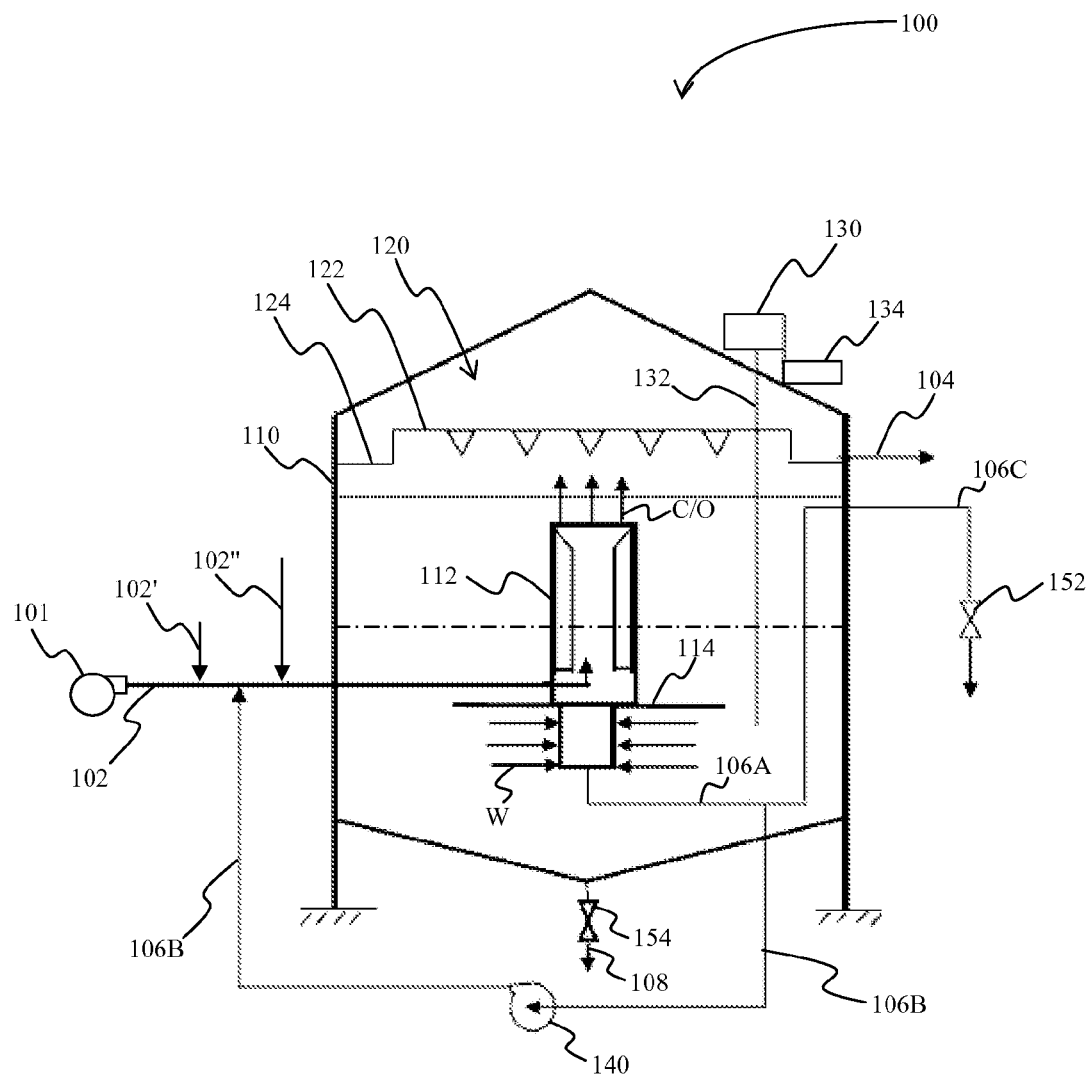

OIL WATER SEPARATION AND SKIMMING DEVICE

This application claims priority to our U.S. provisional application with the Ser. No. 61/420,622, which was filed Dec. 7, 2010.

FIELD OF THE INVENTION

The field of the invention is devices and methods of treating oil-containing water, and especially devices and methods for treatment of produced water from oil fields, production platforms, and/or industrial waste water.

BACKGROUND OF THE INVENTION

Separation of oil-containing water into oil and water is a commonly performed task in most oil production and processing facilities, and there are numerous methods known in the art. For example, oil and various other suspended solids can be passed through an API (American Petroleum Institute) separator using the difference in specific gravity of the oil, water, and suspended solids in a process that is based on the principles of Stokes law. Such separators are conceptually simple and relatively easy to operate, however, often require a secondary treatment device as the separation efficiency is less than ideal. Secondary separation devices include corrugated plates interceptor (CPI) separators in which a series of tilted plates in the flow path is used as an enlarged surface area to enhance coalescence of the oil phase and settlement of the suspended solids. Once more, such separators are relatively simple, however, tend to require at least some maintenance and clean-up.

Where the amount of oil and suspended solids are relatively low, induced gas flotation (IGF) and dissolved gas flotation (DGF) devices can be employed to enhance flotation and separation of the oil and suspended solids. Such devices are often effective, however, require in at least some cases multiple moving parts. Moreover, IGF and DGF devices often require maintenance and are typically less desirable for offshore operation.

Consequently, although many configurations and methods for oil water separation are known in the art, all or almost all of them suffer from various disadvantages. Most significantly, it would be desirable to have a device that could operate as a single device with minimal or no moving parts, and that also requires little or no operator attention. Thus, there is still a need to provide improved methods and devices for oil water separation.

SUMMARY OF THE INVENTION

The present invention is directed to methods and devices for oil water separation in which oil and water are separated from water containing oil such that automated/continuous operation with minimal operator attention is achieved. Most preferably, contemplated devices will be free of moving parts in the separation container and operation is entirely controlled via adjustment of various flow rates, typically using flow control valves and/or feed pumps.

In one particularly preferred aspect of the inventive subject matter, a method of separating oil-containing water into an oil phase and a water phase includes a step of continuously feeding the oil-containing water into a container at a first rate that supports coalescence of oil droplets in the oil-containing water to so form an interface between the oil phase and the water phase. In another step, oil is removed from the oil phase at a second rate via an oil recovery conduit, and/or water is removed from the water phase at a third rate via a water recovery conduit. In still another step, the thickness of the oil phase in the container is measured using a guided wave radar device or other interface detection and level transmitter (IDLT) to obtain a measurement result that is used to adjust the first, second, and/or third rate such that the interface is raised to a position effective to allow removal of at least some of the oil from the oil phase via the oil recovery conduit. Where desirable, solids may be removed from the container at a fourth rate via a solids recovery conduit (most preferably using water from the water phase in a conduit that induces a vortex in the solids at the fourth rate).

In especially preferred aspects, the oil recovery conduit comprises an overflow weir, and/or the oil-containing water is fed into the container through a center column within the container. It is also preferred that water is removed from the container at a position that is below an anti-short circuiting baffle. It is still further contemplated that at least one of the first and second rates are controlled using a flow-control valve, and/or that the measurement result is used to adjust at least two or even all of the first rate, second rate, and third rate.

Therefore, and viewed form a different perspective, the inventor also contemplates a method of controlling separation of an oil-containing water into an oil phase and a water phase. Contemplated methods typically include a step of continuously feeding the oil-containing water into a container at a first rate and continuously separating the oil-containing water in the container into the oil phase and the water phase. In another step, an oil recovery conduit (preferably comprising an overflow weir) is positioned above the oil phase such that oil from the oil phase can be withdrawn at a second rate, and a water recovery conduit is positioned below the interface between the oil and water phase such that water can be withdrawn at a third rate. In yet another step, a control signal is used to adjust the first, second, and/or third rate to so raise the oil phase such that at least some of the oil from the oil phase can be withdrawn via the oil recovery conduit. Most typically, the control signal is generated by a control circuit that receives a signal from a guided wave radar device or other IDLT in which the sensor contacts the oil phase and the water phase.

Where desired, it is contemplated that such methods may further comprise a chemical pretreatment step of the oil-containing water before feeding the oil-containing water into the container. Furthermore, it is contemplated that the container may additionally include a coalescing filter and/or a center column within the container to receive the oil-containing water.

Consequently, in another especially preferred aspect of the inventive subject matter, a separator for separation of oil-containing water into an oil phase and a water phase will include a container (configured to allow separation of the oil-containing water into the oil phase and the water phase) with a feed conduit that has a feed mechanism to provide the oil-containing water at a first rate to the container. Most typically, an oil recovery conduit is positioned above the oil phase to allow withdrawal of oil from the oil phase at a second rate, and a water recovery conduit that is positioned below the interface between the oil and water phase to allow withdrawal of water from the water phase at a third rate. A guided wave radar device or other IDLT is coupled to the container such that the sensor contacts the oil phase and the water phase, and a control device is coupled to the guided wave radar or other IDLT and produces a control signal to adjust the first, second, and/or third rate to thereby allow raising the oil phase in an amount effective that at least some of the oil from the oil phase can be withdrawn via the oil recovery conduit. Further preferred separators will include an anti-short circuiting baffle, a coalescing filter, and/or a center column within the container, and it is especially preferred that the oil recovery conduit comprises a (typically V-notched) overflow weir.

Various objects, features, aspects and advantages of the inventive subject matter will become more apparent from the following detailed description of preferred embodiments, along with the accompanying drawing figure in which like numerals represent like components.

BRIEF DESCRIPTION OF THE DRAWING

FIG. 1 is a schematic illustration of a separator according to the inventive subject matter.

DETAILED DESCRIPTION

The inventor has discovered that separation of oil-containing water into an oil phase and a water phase can be simply and effectively achieved in methods and devices that allow for automated/continuous operation with minimal operator attention. Moreover, contemplated devices and methods further reduce, and more typically even entirely eliminate moving parts in the separation container, and thus dramatically reduce downtime due to maintenance or repair.

Most preferably, devices and methods of separation of the oil-containing water into an oil phase and a water phase rely on flow control of the feed stream, the oil stream from the oil phase, and/or the water stream from the water phase to thereby vertically move the interface between the phases. In especially preferred devices and methods, the flow control is based on measurements of a guided wave radar device, and oil is removed from the oil phase using a (typically) static overflow weir. Water is preferably removed from the water phase at a location below the location where the feed stream enters the container, while solids can be removed using a portion of the water. Most typically, the container is shaped such that the solids are removed in a vortex motion from the bottom of the container.

Therefore, it should be appreciated that oil-containing water can be separated into an oil phase and a water phase by continuously feeding the oil-containing water into a container at a first rate that supports coalescence of oil droplets in the oil-containing water to so form an interface between the oil phase and the water phase. Oil can then be removed from the oil phase using an oil recovery conduit, which is most preferably a static overflow weir or other overflow structure at a second rate. Depending on the composition of the oil-containing water, oil removal may be continuously or intermittently as described in more detail below. Likewise, water is removed from the water phase via a water recovery conduit at a third rate. In most typical devices and methods, the water recovery conduit is located below the feed point of the oil-containing water into the container. Once more, and as described in more detail below, water removal may be intermittent, and more typically continuous. Thus, it should be appreciated that both the oil recovery conduit and the water recovery conduit are static with respect to their vertical position relative to the container bottom, and that by moving the interface between the oil and water phases oil removal at a desired rate is easily controlled. It should therefore be appreciated that the thickness of the oil phase and/or the vertical position of the interface in the container must be controlled, and that such control is most preferably performed in an automated manner. Most preferably, the thickness of the oil phase and/or the vertical position of the interface is measured using a guided wave radar device, and the measurement is used to adjust the first, second, and/or third rate such that the interface is raised to a position effective to allow removal of at least some of the oil from the oil phase via the oil recovery conduit. Of course, it should be recognized that a measurement may also be used to lower the position of the interface to reduce or even halt removal of the oil.

Thus, numerous devices other than a guided wave radar device can be used as the IDLT, and suitable alternative devices include ultrasonic interface and level detectors, optical interface and level detectors, flotation (magnetic and mechanic) interface and level detectors, radiometric interface and level detectors, optical interface and level detectors, RF (radio frequency) admittance interface and level detectors, etc. Therefore a, suitable IDLT may be used and/or configured to measure both the vertical positions of the interface between the oil and water phase and the thickness of the oil phase (and/or water phase), or may be used and/or configured to measure only one of the vertical position of the interface between the oil and water phase and the thickness of the oil phase (and/or water phase).

Viewed from a different perspective, separation of a continuous feed stream (at a first rate) of an oil-containing water into an oil phase and a water phase can be controlled by positioning an oil recovery conduit above the oil phase such that oil from the oil phase can be withdrawn (at a second rate) without a pump or other moving parts, and by positioning a water recovery conduit below the interface between the oil and water phase, and more typically below the feed point of the oil-containing water such that water can be withdrawn (at a third rate). A control circuit then receives a signal from a guided wave radar device or other IDLT in which the sensor contacts the oil phase and the water phase to produce a control signal that is then used to adjust the first, second, and/or third rate (typically via flow control valve or pump external to the container) to so raise the oil phase such that at least some of the oil from the oil phase can be withdrawn via the oil recovery conduit.

For example, FIG. 1 schematically illustrates a separator 100 for separation of oil-containing water into an oil phase and a water phase. The separator comprises a container 110 that receives oil-containing water feed stream 102 from feed pump 101 that acts as the feed mechanism. A stream of chemicals 102' (e.g., flocculants, acid or base, etc) and/or a stream of gas 102" is added to the oil-containing water feed stream 102 as required or desirable. Also combined with oil-containing water feed stream 102 is recycle stream 106B, which is in most cases a fraction of the water that is withdrawn from the water phase. External pump 140 is used to move the recycle stream 106B.

The oil-containing water feed stream 102 (containing one or more chemicals, gas, and/or recycle stream 106B as needed) is fed to center column 112 using feed pump 101 at a first rate. The feed rate is typically selected such as to allow coalescence of oil droplets in the oil-containing water to thereby form an interface between the oil phase and the water phase. Where desired, additional elements may be added to the feed stream conduit and/or center column (e.g., coalescing filter). Coalesced oil droplets (C/O) leave center column and form an oil phase above the water phase while water (W) sinks towards the bottom of the container. The dashed line indicates a lower level of fluid, while the dashed-dot line indicates a typical oil-water interface.

It is further typically preferred that the center column is coupled to a baffle (anti-short circuit baffle) and that the baffle is placed below a position where the feed stream 102 enters the container. Thus, water (W) withdrawn from the container via stream 106A is at least somewhat protected from contamination with the feed stream or portions of the feed stream (e.g., solids). While one portion of the water can be recycled as recycle stream 106B, another portion of water is removed as stream 106C from the container via flow control valve 152. It is especially preferred that the bottom portion of the container is configured such that solids that have settled to the bottom of the container can be removed using the water from the water phase in such a manner that the water and solids entrained in the water will be moved in a cyclonic pattern. Such configuration will advantageously reduce or even eliminate the need for a sweeper arm or other moving structure to convey solids. Solids are typically removed via solids stream 108 through solids removal valve 154.

Oil recovery conduit 120 is preferably positioned above the upper surface of the oil in the oil phase during at least some part of operation as shown in FIG. 1. Oil recovery conduit 120 includes a V-notched overflow weir and an effluent launder 124 and is fluidly coupled to an oil recovery pipe 104 (which may or may not comprise a flow control valve or pump). Guided wave radar device 130 acts as an IDLT and has a sensor/wave guide 132 that is in contact with the oil phase and the water phase and sends a signal to control device 134. The control device 134 in turn uses the signal(s) from the guided wave radar device 130 to produce a control signal to adjust the first rate, the second rate, the third rate, and/or pump rate of the external pump 140 to thereby raise the oil phase such that at least some of the oil from the oil phase can be withdrawn via the oil recovery conduit.

In one exemplary method, at least some of the water is removed from the container and the thickness of the oil phase (or position of the interface) is determined by a guided wave radar device and control device. Once the oil phase has reached a predetermined thickness, the flow rate in the water recovery conduit is reduced (or entirely stopped) for a time sufficient to allow displacement of at least some of the oil from the oil phase via the oil recovery conduit by feeding oil-containing water into the container. Most typically, and as shown in exemplary FIG. 1, the displacement of the oil is achieved by overflow of the oil over a weir (e.g., V-notch weir) into a receiving structure, most preferably a peripheral launder. Alternatively, where the signal of the guided wave radar device or other IDLT is indicative of a predetermined thickness of the separated oil layer, the control circuit may provide a signal to a valve that at least partially closes the effluent conduit and/or increases rate of influx of water containing oil. Consequently, the interface between the separated oil and the separated water will raise in the container to a point at which the separated oil can leave the container (preferably by gravity flow via peripheral launder and/or one or more drain pipes). Once a predetermined quantity of separated oil has drained, or once the interface has reached a predetermined position, the control circuit may provide a signal to a valve that at least partially re-opens the effluent conduit and/or decreases rate of influx of water containing oil. Consequently, the interface between the separated oil and the separated water will drop in the container to a point at which continuous separation will continue into a subsequent separation cycle. Of course, all other manners of flow control are also contemplated, including use of one or more surge tanks that are fluidly and separately coupled to the oil and water phase to allow at least temporary diversion of the oil and water from the container, vertical movement of the overflow weir, or opening and closing of one or more vertically positioned valves. However it is generally preferred that the container and flow conduits are fixed and do not require any moving parts. Viewed from a different perspective, it should be noted that all components with moving parts will be positioned outside the container to facilitate maintenance and/or repair.

Therefore, it should be appreciated that contemplated methods and devices enable a fully automated manner of oil water separation with minimal operator input. Indeed, as contemplated devices will include no or few moving parts, maintenance downtime is significantly reduced. In still further preferred aspects, it is contemplated that the devices and methods presented herein will achieve a separation efficiency that will reduce, and more preferably eliminate, secondary treatment steps for the water containing oil.

Thus, specific embodiments and applications of oil water separation have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of separating in a container an oil-containing water into an oil phase and a water phase, comprising:
    continuously feeding the oil-containing water through a feed conduit into a lower end of a center column disposed in the container at a first rate, wherein the center column has an upper end positioned within the container, wherein the lower end is coupled to a baffle disposed in the container, wherein the baffle is positioned below the lower end of the center column;
    coalescing oil droplets in the oil-containing water within the center column to separate the oil-containing water into an oil phase and a water phase;
    flowing the oil phase and the water phase from the center column into the surrounding container to thereby form an interface between the oil phase and the water phase in the container;
    continuously removing from the container at least one of (a) oil from the oil phase at a second rate via an oil recovery conduit, and (b) water from the water phase at a third rate via a water recovery conduit having an inlet disposed below the baffle;
    pumping a portion of the water in the water recovery conduit into the feed conduit at a pump rate;
    measuring a thickness of the oil phase or position of the interface in the container with an interface detection and level transmitter to obtain a measurement result; and
    using the measurement result to adjust the first rate, the second rate, the third rate, and the pump rate to ensure that at least some of the oil is removed from the oil phase via the oil recovery conduit.

2. The method of claim 1, wherein the interface detection and level transmitter is a guided wave radar.

3. The method of claim 1, further comprising a step of removing from the container solids at a fourth rate via a solids recovery conduit using water from the water phase.

4. The method of claim 3, wherein the solids recovery conduit is configured to induce a vortex in the solids as the solids are removed from the container at the fourth rate.

5. The method of claim 1, wherein the oil recovery conduit comprises an overflow weir.

6. The method of claim 1, wherein at least one of the first and third rates are controlled using a flow-control valve.

7. A method of controlling separation of an oil-containing water into an oil phase and a water phase, comprising:
  continuously feeding the oil-containing water into a lower end of a center column disposed in a container at a first rate, wherein the center column has an open upper end positioned below an upper end of the container, wherein a baffle is disposed in the container and coupled to the lower end of the center column;
  continuously separating the oil-containing water in the container into the oil phase and the water phase;
  withdrawing oil from the oil phase in the container at a second rate through an oil recovery conduit above the oil phase;
  withdrawing water from the water phase in the container at a third rate through a water recovery conduit below an interface between the oil phase and the water phase;
  measuring a thickness of the oil phase in the container or a position of an interface of the oil phase and the water phase;
  adjusting the first rate and the second rate in response to the measured thickness of the oil phase or the position of the interface of the oil phase and the water phase to thereby raise the oil phase such that at least some of the oil from the oil phase is withdrawn via the oil recovery conduit.

8. The method of claim 7, further comprising a step of chemical pretreatment of the oil-containing water before feeding the oil-containing water into the container.

9. The method of claim 7, further comprising feeding the oil-containing water through a coalescing filter disposed within the container.

10. The method of claim 7, further comprising using an interface detection and level transmitter to measure the thickness of the oil phase in the container or the position of an interface of the oil phase and the water phase;
  wherein the interface detection and level transmitter is a guided wave radar.

11. The method of claim 7, using the measurement of the thickness of the oil phase in the container or the position of the interface of the oil phase and the water phase to produce a control signal to adjust the first rate, the second rate, and the third rate.

12. The method of claim 7, wherein the first rate, the second rate, and the third rate are adjusted to allow continuous withdrawal of the at least some of the oil from the oil phase via the oil recovery conduit.

13. A separator for separation of oil-containing water into an oil phase and a water phase, comprising:
  a container;
  a feed conduit with a feed mechanism, wherein the feed conduit extends through the inside of the container and into a lower end of a center column positioned within the container, wherein the center column has an open upper end positioned below an upper end of the container, and wherein a baffle is disposed in the container and coupled to the lower end of the center column;
  wherein the feed mechanism is configured to provide the oil-containing water at a first rate into the center column, wherein the container is further configured to allow separation of the oil-containing water into the oil phase and the water phase;
  an oil recovery conduit that is positioned above the oil phase and configured to allow withdrawal of oil from the oil phase at a second rate;
  a water recovery conduit that is positioned below an interface between the oil phase and the water phase and configured to allow withdrawal of water from the water phase at a third rate;
  an interface detection and level transmitter that is configured to measure at least one of a thickness of the oil phase and a position of the interface and to produce a measurement signal; and
  a control device that is configured to use the measurement signal to produce a control signal;
  wherein the control signal is configured to adjust the first rate to thereby allow raising the oil phase such that at least some of the oil from the oil phase is withdrawn via the oil recovery conduit.

14. The separator of claim 13, further comprising a coalescing filter within the container and configured to receive the oil-containing water.

15. The separator of claim 13, wherein the oil recovery conduit comprises an overflow weir.

16. The separator of claim 13, wherein the control device is configured to produce the control signal to adjust one or both of the second rate and the third rate.

17. The separator of claim 13, further comprising:
  a water recycle conduit extending from the water recovery conduit to the feed conduit and configured to circulate a portion of the water in the water recovery conduit to the feed conduit;
  a pump positioned along the water recycle conduit and configured to move the portion of water from the water recovery conduit to the feed conduit at a pump rate;
  wherein the control signal is configured to adjust the first rate, the second rate, the third rate, and the pump rate to thereby allow raising the oil phase such that at least some of the oil from the oil phase is withdrawn via the oil recovery conduit.

* * * * *